July 16, 1940.　　A. V. NEWMAN ET AL　　2,207,938
CANDY CUTTING MACHINE
Filed March 17, 1939　　4 Sheets-Sheet 4
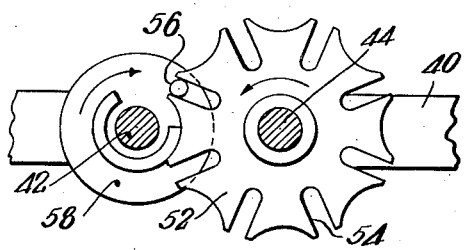
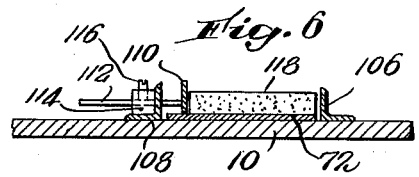
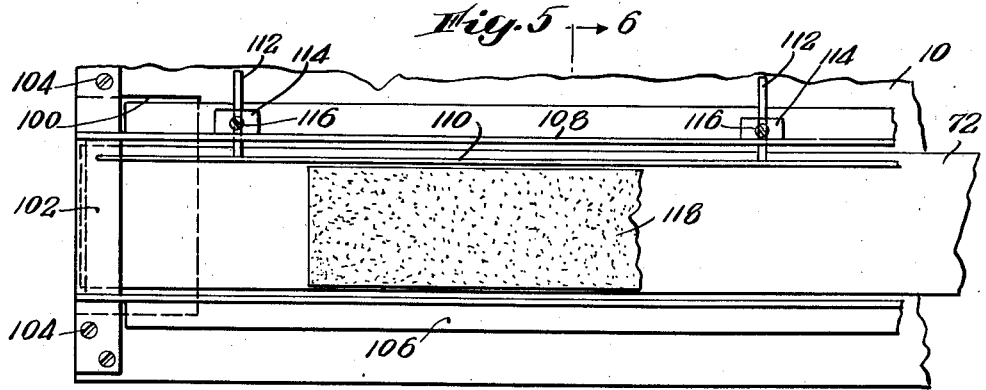
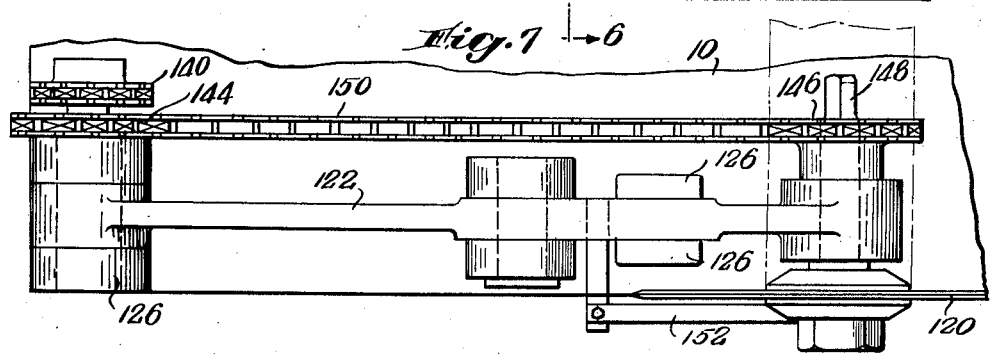
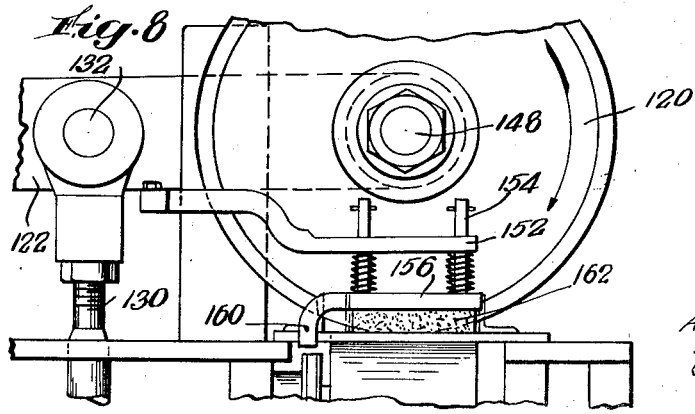
Inventors:
ALBERT VICTOR NEWMAN
GUY R. LEWIS
by Thomson & Thomson
his Attys.

Patented July 16, 1940

2,207,938

UNITED STATES PATENT OFFICE 2,207,938

CANDY CUTTING MACHINE

Albert Victor Newman, Cambridge, and Guy R. Lewis, Melrose, Mass., assignors to Edgar P. Lewis & Sons, Inc., Malden, Mass., a corporation of Massachusetts Application March 17, 1939, Serial No. 262,546

1 Claim. (Cl. 107—22)

This invention relates to improvements in a candy cutting machine which receives the strips of candy, such as nougats, and cuts the strips in individual pieces of the desired size.

In the manufacture of nougat candy it is customary practice to make large slabs of the nougat which are presented to cutting knives to divide the slabs into strips. The subsequent cutting of the strips into individual pieces in many cases is performed manually to the extent that the operator feeds the candy to a rotary cutting knife.

It is an object of our invention to provide an improved machine for cutting nougat pieces which will require little attention from the operator while in operation, and which is designed to be readily and quickly adjusted to handle strips of the nougat candy of different widths, and to cut the candy into uniform pieces of any desired size.

It is further an object of this invention to provide a candy cutting machine in which a rotary cutter is employed mounted on an arm for vertical movement with respect to the strip of candy, and including a conveyor intermittently movable to feed the candy towards the cutting knife. The intermittent movement of the conveyor and the movement of the rotary knife into cutting position may be maintained in timed relation by driving means from a single source of power.

It is further an object of our invention to provide improved means for holding the nougat piece as it is being cut in order to prevent being thrown by the motion of the knife.

Further objects and advantages of our improvements will be more readily apparent from the following description of a preferred embodiment of the machine as shown in the attached drawings, in which:

Fig. 4 is a detail elevation of the Geneva drive for the conveyor;

Fig. 5 is a fragmentary plan view of the candy feeding conveyor;

Fig. 6 is a cross section taken on the plane indicated 6—6 in Fig. 5;

Fig. 7 is a fragmentary plan view of a drive for the rotatable knife; and

Fig. 8 is a fragmentary front elevation of the knife and presser foot for the candy as it is being cut.

Figure 1:
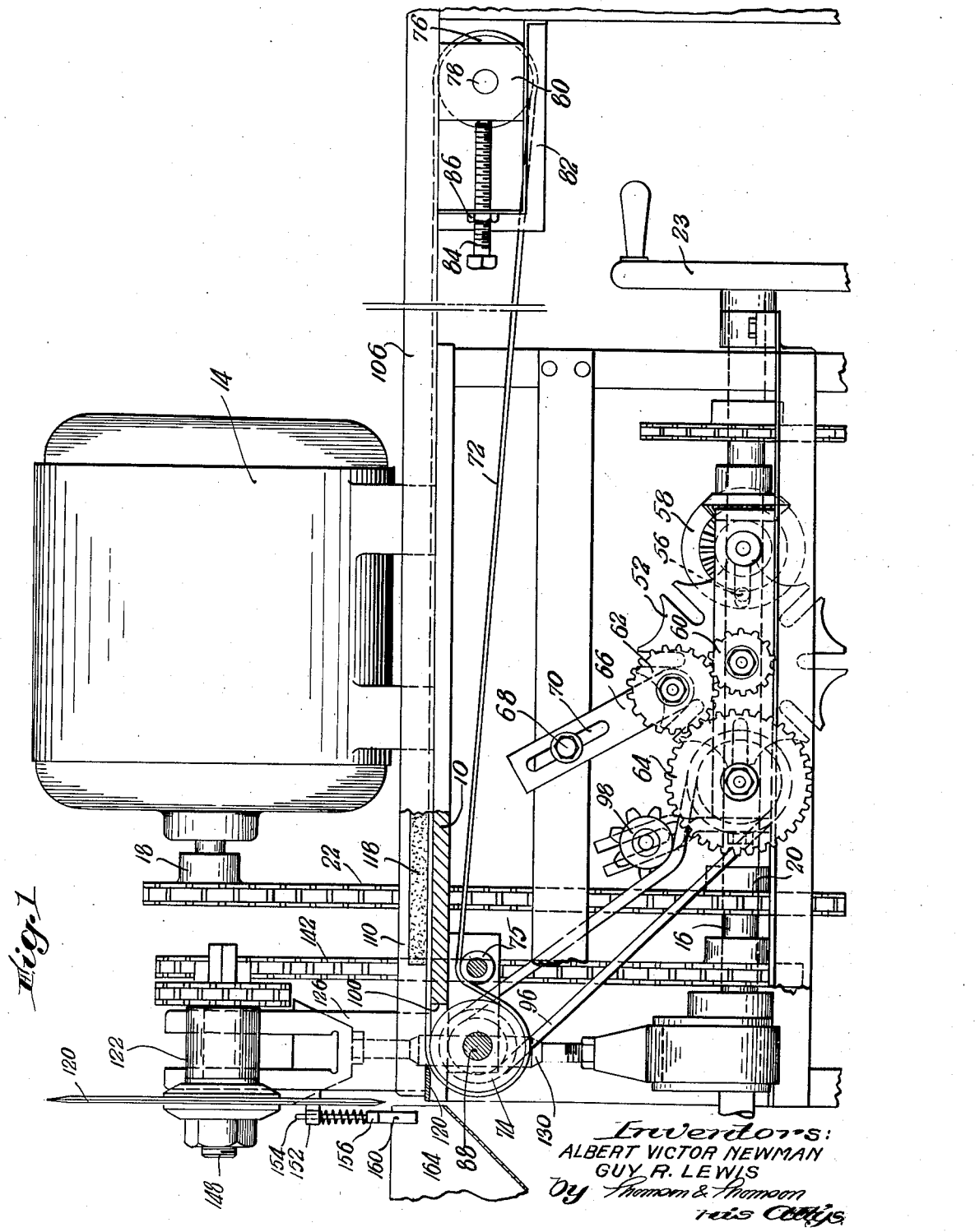
Fig. 1 is a side elevation of the machine with parts broken away for clearness.
Figure 2:
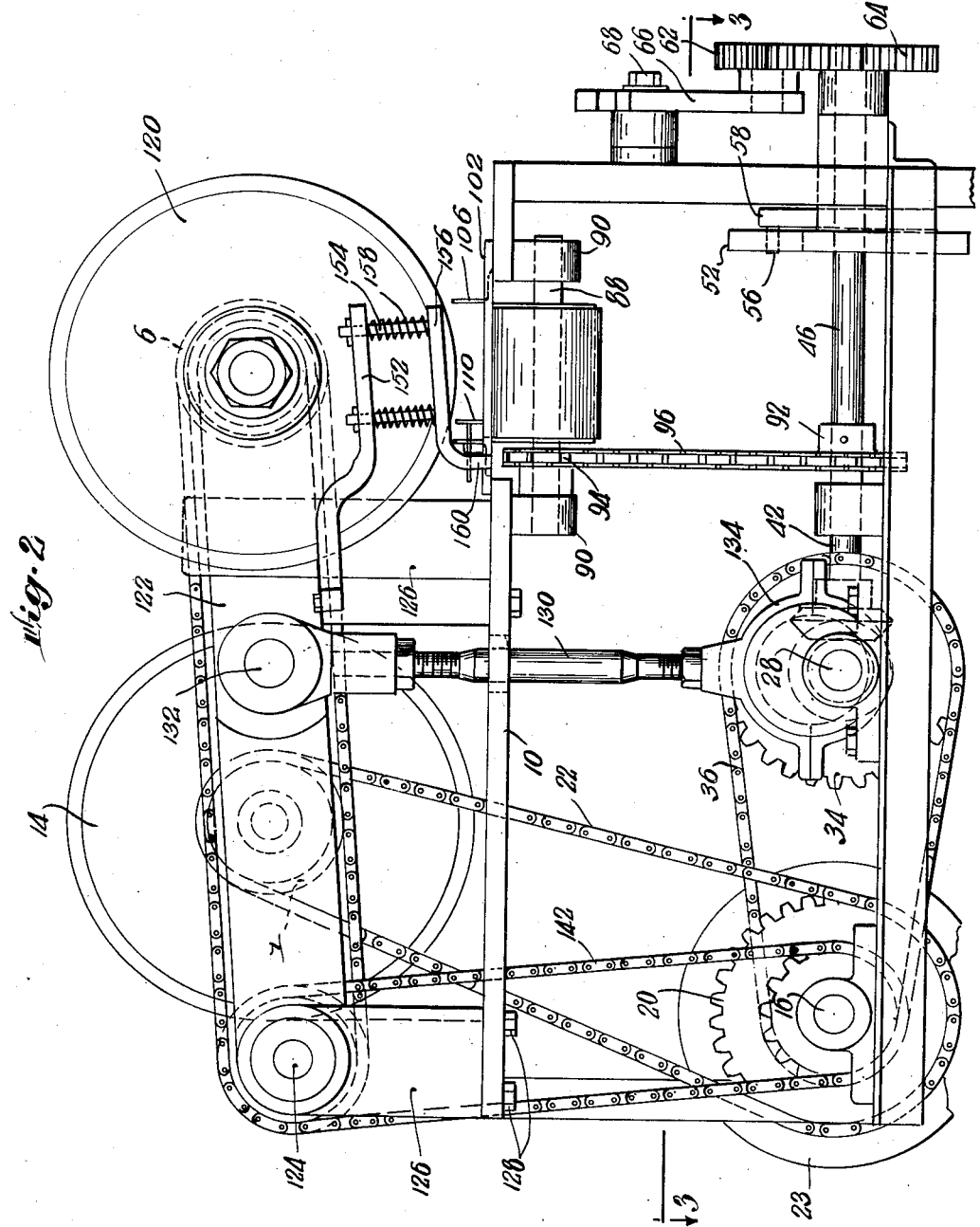
Fig. 2 is a front elevation of the machine.
Figure 3:
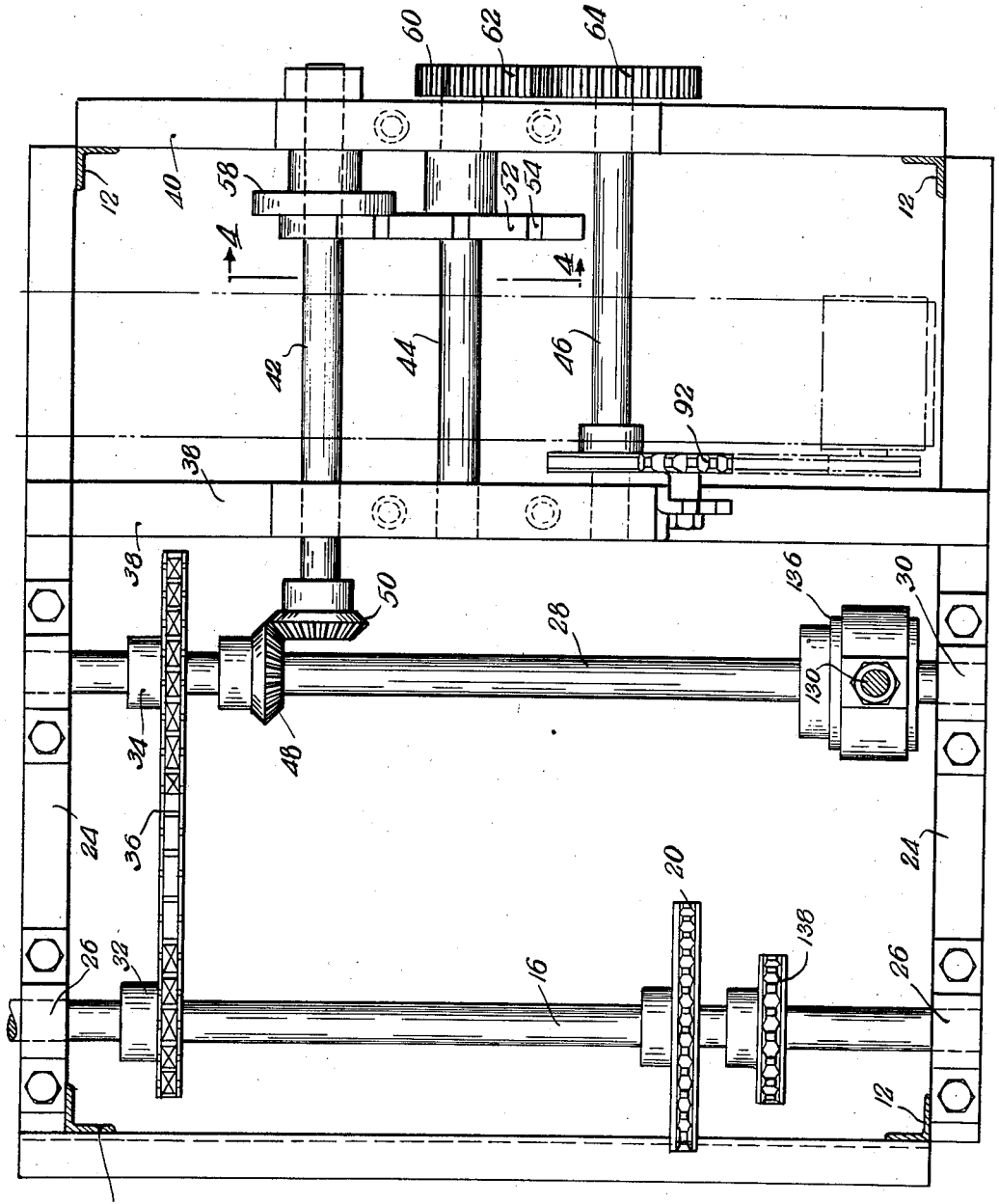
Fig. 3 is a horizontal sectional view taken on the plane indicated 3—3 in Fig. 2.

The candy cutting machine illustrated includes a frame made up of a table 10 supported by the legs 12, the driving motor 14 is mounted on the table 10 and transmits power to the main shaft 16 through the sprocket gears 18 and 20 which are coupled by chain 22. The main shaft may be turned manually by hand-wheel 23. The cross braces 24 provide bearing support 26 for the main shaft 16. The counter shaft 28 is also mounted on the braces 24 by the springs 30, and power is transmitted from the main shaft to the counter shaft through the sprocket gears 32, 34 and chain 36. Chain cross bars 38 and 40 are provided to support the three counter shafts 42, 44 and 46. The shaft 42 is driven from the counter shaft 28 through the meshing beveled gears 48 and 50; shaft 44 is driven intermittently from shaft 42 through the Geneva wheel 52 having the radial slots 54 which are engaged by the pin 56 of the guiding disc 58. The intermittent motion of shaft 44 is transmitted to the shaft 46 through change gears 60, 62 and 64. The gear 60 being mounted on a shaft 44, the gear 64 being mounted on shaft 46 and the idler gear 62 being mounted on an arm 66 which is adjustably fixed in position by the bolt 68 engaging the slot 70.

Any desired amount of intermittent movement may be obtained by the selection of the proper sizes of the gears 60, 62 and 64. A conveyor belt 72 is supported at one end by the driving roller 74, and an adjacent guide roller 75, and at the other end by an adjustable guide roller 76. The guide roller 76 is rotatably mounted at 78 in the block 80 which is slidably mounted in the frame part 82 and is movable to tension the conveyor belt by means of the adjustable bolt 84. The bolt 84 is fixed in adjusted position by the lock nut 86. The shaft 88 which supports the driving roller 74 is mounted in the bearings 90 beneath the table 10.

Intermittent motion is transmitted to the conveyor belt from the shaft 46 through the sprocket gears 92, 94 and the sprocket chain 96. An adjustably mounted idler gear 98 is provided for engagement with the sprocket chain 96. The conveyor belt may be made of any desired length so that a considerable supply of candy may be assembled on the conveyor belt for feeding to the cutting knife. The upper run of the conveyor belt rests upon the table 10 up to a point just before the driving roller is reached, at which point the table is cut away as indicated at 100, and as shown in dotted lines in Fig. 5. The driving roller is mounted to extend into the opening 100 and the pick-up plate 102 is fastened by the screws 104 to the table, and receives candy from the conveyor belt.

As shown in Fig. 6, an L-shaped guide member 106 is mounted on the table at one side of the conveyor belt and an angle bar 108 is provided at the opposite side of the conveyor belt. A guide strip 110 is provided carried by the pins 112 which are received as bosses 114 of the angle bar 108 whereby the guide strip 110 may be moved and adjustably fixed in position to accommodate various widths of candy strips which are fed by the conveyor belt. The guide rail 110 is held in adjusted position by the screws 116 which engage the pins 112. In Fig. 5 a strip of the nougat candy 118 is shown on the conveyor belt as it is fed towards the knife. The rotary disc knife 120 is supported at the outer end of the arm 122 which is pivotally mounted at 124, in the support 126 fixed to the upper side of the table 10 by the bolts 128. The knife arm 122 is moved up and down by the adjustable eccentric arm 130 which is pivotally attached to the arm 122 at 132. The eccentric arm 130 has an eccentric strap 134 engaging the eccentric 136 on the counter shaft 28. Power is transmitted to the rotary knife from the main shaft 16 through the sprocket gears 138 and 140 coupled by the chain 142. The gear 140 is mounted concentrically with respect to the pivot 124, for the arm 122 and is fixed with respect to sprocket gear 144 from which motion is transmitted to a sprocket gear 146 mounted on the shaft 148 for the knife through the sprocket chain 150. The knife arm 122 has mounted thereon an offset arm 152 which carries through the pins 154 a presser foot 156. The foot member 156 is resiliently held in position by the compression springs 158 and the presser foot 156 has at one end, in the direction of the rotation of the knife, a downwardly bent portion 160 which as illustrated in Fig. 8 will direct the candy piece 162, as it is cut off, into the hopper 164.

In operation the candy strips are laid upon the conveyor belt at the far end of the conveyor and are intermittently fed towards the cutting knife through the movement transmitted to the conveyor belt from the driving motor through the Geneva drive and the adjustable change gears. As the rotary cutting knife moves upward the conveyor belt moves to feed the end of the candy strip into position for the next cutting operation of the knife. As the knife moves downwards the conveyor belt will be stationary and the end of the candy strip will be gripped by the presser foot 156. The candy pieces as they are cut off are prevented from being carried around or from being thrown by the knife through the provision of the presser foot 156 and the depending arm 160, and therefore are forced to fall into the hopper 164. By the adjustments provided, different widths of candy strips may be handled by the conveyor, and the size of the pieces cut may be regulated through the means for adjusting the travel of the conveyor as it is intermittently moved step by step.

We claim:

In a candy cutting machine, a frame, forming a table, a main shaft mounted in the frame beneath the table, a parallel counter shaft driven from said main shaft, a conveyor belt for feeding strip candy to the machine, the top run of said belt being supported by said table, means for imparting step-by-step movement to the conveyor belt from said counter shaft comprising a Geneva drive and change gears for varying the step movement, a knife carrying arm mounted for vertical swingable movement above said table, eccentric means for swinging said arm from said counter shaft in timed relation to the step-by-step movement of the conveyor, a rotary cutting knife carried by said arm, said knife having its axis parallel to the direction of movement of the candy and movable by said arm across the path of the candy beyond the end of the conveyor and means for rotating said knife from said main shaft.

ALBERT VICTOR NEWMAN.
GUY R. LEWIS.